United States Patent [19]

Schmidt et al.

[11] 4,180,312
[45] Dec. 25, 1979

[54] PHOTOGRAPHIC CAMERA WITH THROUGH THE LENS EXPOSURE METER

[75] Inventors: Ewald Schmidt, Braunfels; Willi Wiessner, Wetzlar, both of Fed. Rep. of Germany

[73] Assignee: Ernst Leitz Wetzlar GmbH, Wetzlar, Fed. Rep. of Germany

[21] Appl. No.: 873,608

[22] Filed: Jan. 30, 1978

[30] Foreign Application Priority Data

Feb. 9, 1977 [DE] Fed. Rep. of Germany ....... 2705300

[51] Int. Cl.$^2$ .............................................. G03B 7/00
[52] U.S. Cl. ................................................... 354/59
[58] Field of Search ...................... 354/41, 49, 53, 54, 354/55, 56, 57, 59, 23 R

[56] References Cited

U.S. PATENT DOCUMENTS

| 3,532,043 | 10/1970 | Shimomura | 354/54 |
| 4,065,777 | 12/1977 | Maitani et al. | 354/59 X |

*Primary Examiner*—Michael L. Gellner
*Attorney, Agent, or Firm*—Gilbert L. Wells

[57] ABSTRACT

Photographic camera with through the lens exposure metering where the exposure meter is equipped with a silicon- or gallium-arsenide-phosphorus-diode mounted in the space behind the objective and receiving the light. The exposure meter is switchable between integrating and selective metering mode. Two optical systems (12,13) are mounted in front of the light-sensitive diode (10) and are located in the illumination beam being measured. Either of the optical systems is selectively brought into position into the beam in front of the diode (10). One of the systems, namely (13), guides the light from almost the entire object space onto the diode (10). The other system (12) guides only light from a restricted sector of the object space onto the diode (10). By connecting a light intensity attenuator (13a) with the integrating metering system, where the attenuator is moved into the illumination beam being metered together with the integrating system, the attenuator serves to achieve equal illumination intensities on the diode (10) for both the integrated and the selective measurements.

13 Claims, 11 Drawing Figures

13a { optical wedge
plane parallel plate
neutral density plate

PHOTOGRAPHIC CAMERA WITH THROUGH THE LENS EXPOSURE METER

BACKGROUND OF THE INVENTION

The present invention relates to photographic cameras, having a system for exposure metering through the objective, with selective switching between an integrated and a selected measurement.

Such a camera, the disclosure of which is incorporated herein, is disclosed in the U.S. Pat. Nos. 3,532,043 and 3,884,584.

It is known from these prior art cameras to provide two photoresistors behind the picture taking lens, one of which is used for an integrated measurement and the other for a selected measurement. It is known to switch from one to the other of these integrated and selective measurements. However, the design also may be such that only one photoresistor is used for the selective measurement, while a second photoresistor is added for the integrated measurement, so that for the integrated one, both are used.

In any event, switching from one measurement to the other requires some electrical switching, reversal or hooking up. However direct electrical switching is impossible when modern photoelectric transducers in the form of silicon-, or gallium-arsenide-phosphorus-diodes are used in lieu of the prior photoresistors. Commercial examples of these diodes are, for example, the type VTB 9416 B of Messrs. VACTEC, Inc., 2423 Northline Ind. Blvd., Maryland Heights, Mo. 63043, USA and type BS 2030 B of Messrs. SHARP, Japan. This is due to the extremely minute currents passing through these diodes. Amplifiers are required in order to switch these diodes, but these amplifier systems and the associated switches are complex and costly.

SUMMARY OF THE INVENTION

Having in mind the limitations of the prior art, it is an object of the present invention to develop a system allowing integrated and selective measurements even when silicon-, or gallium-arsenide-phosphorus-diodes are used, without requiring electrical switching.

This object is achieved according to the present invention by mounting two optical systems in front of the light sensitive diode and in the beam being measured for exposure, where one of these systems is selectively brought into the beam in front of the diode. One of the systems collects the rays from almost the entire object space onto the diode (integrated measurement) while the other system collects only the rays from a limited sector of the object space onto the diode (selective measurement). A light attenuating means is associated with the system providing the integrated measurement and is simultaneously brought into the measured beam with the integrating system and provides the same intensity of illumination on the diode for integral and selective measurements.

These two optical systems are appropriately mounted on a common support which is displaceable or pivotable inside the camera so that either system is moved into the measuring beam. This common support is connected to an externally accessible actuation member so that displacement or pivoting is caused from outside the camera.

In particular it is proposed to design the two systems so that the selective exposure measurement applies to a circular field in the object space and therefore a circular field also illuminates the diode, while the integrated exposure measurement essentially applies to a rectangular or at least to an oval field which then illuminates the diode. To achieve the latter effect, at least one lens element is provided in the optical system, where the lens element has a cylindrical surface on the side facing the diode, the other surface away from the diode being spherical. An optical system consisting of at least one conventional spherical lens element suffices to obtain the circular measuring field.

A light intensity attentuator is provided in the integrated system in order to ensure the same illumination intensity when dealing with the larger measuring field as in the selective measurement which involves a smaller field. This light intensity attenuator in a particular embodiment for instance is a plane parallel plate connected to the integrating system by being mounted in front of the spherical surface of the lens element. This plate is a neutral density filter when the ordinary glass absorption does not suffice.

A preferred embodiment, however, uses an optical wedge, for instance a neutral density wedge is used as such a light intensity attenuator. Such a neutral density wedge on the one hand ensures nonuniform attenuation above the diode and on the other hand ensures a slight bending of the optical axis and hence of the transmitted light beam. Both effects are propitious for the integrated measurement, namely to lessen the strong contribution from the light of the sky and thus to enhance the light from the concrete parts of the object.

Regarding the present invention, there is no significance per se as to how and by what means the light reaches the photodiode. However, in a particularly practical embodiment a reflecting surface is mounted in front of the film plane to reflect the light passing through the objective to the diode. In the case of a mirror reflex camera with a partly transmitting reflex mirror, such a reflecting surface may be operationally coupled with the reflex mirror and together with it may then be swung out of the picture taking beam as disclosed in U.S. Pat. No. 3,468,233. This reflecting surface furthermore may be provided with convex or concave bosses such as honeycombs or domes in order to reflect the largest possible proportion of the light to the diode.

BRIEF DESCRIPTION OF THE DRAWINGS

The drawings illustrate the present invention by showing an embodiment of a single lens mirror reflex camera with focal plane shutter, wherein:

FIG. 1 is a schematic cross-sectional side view of a mirror reflex camera having the two optical measurement systems, that for the selective measurement being switched on;

FIG. 2 is a schematic of the camera of FIG. 1 with the integrating optical system switched on;

DESCRIPTION OF THE PREFERRED EMBODIMENTS

Figure 1:
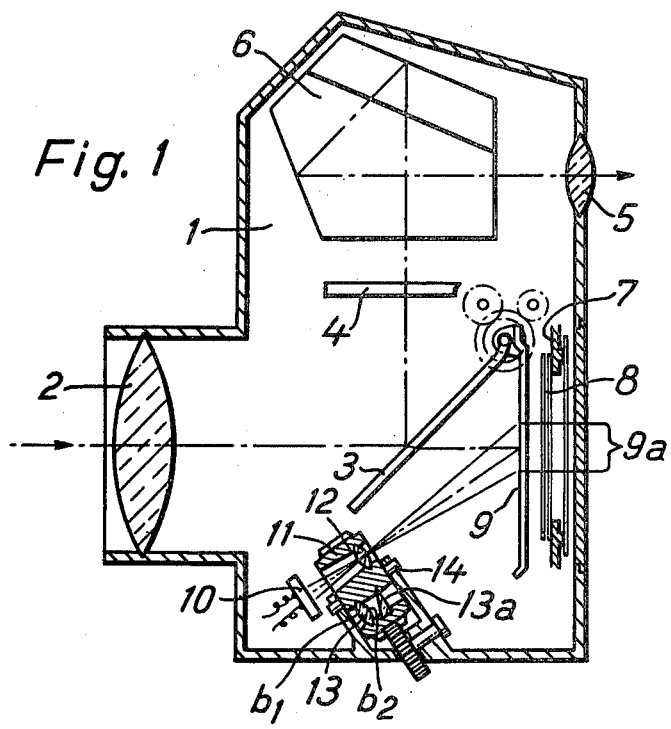
Figure 2:
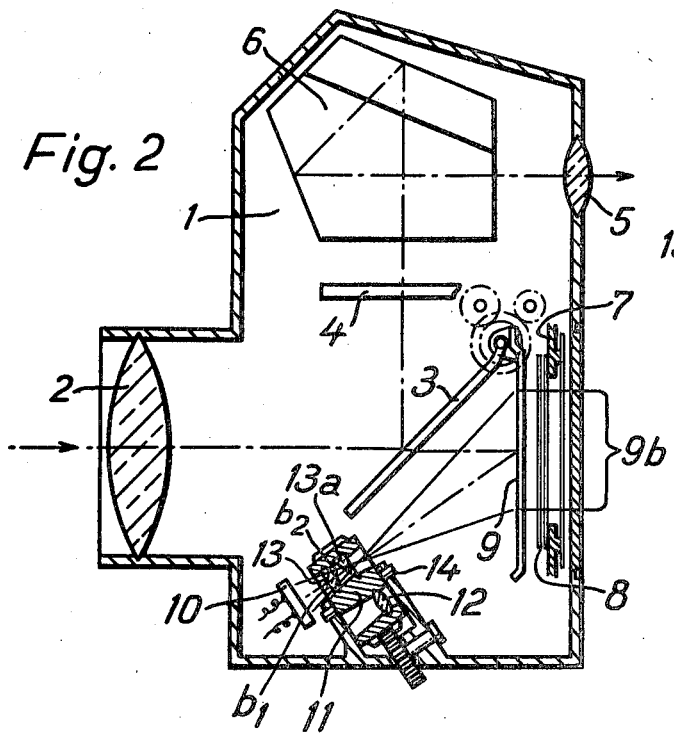
Figure 3:
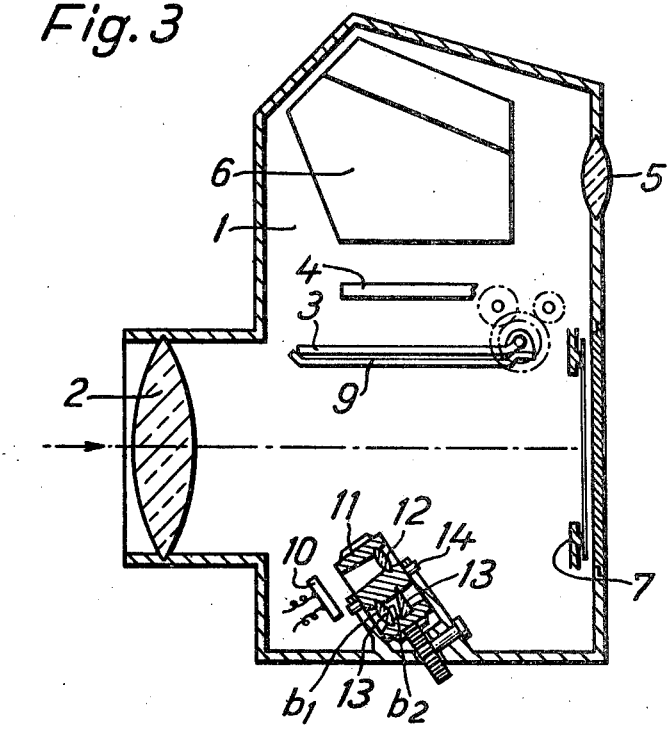
FIG. 3 is a schematic of the camera of FIG. 1 with the selective optical system switched on and with the reflex mirror and the reflecting surface both in the picture taking position.

The camera housing shown in FIGS. 1, 2 and 3 is always designated by 1, and it holds objective 2 at the front. A partly transmitting and silvered reflex mirror 3 deflecting the viewer beam to a focusing screen 4 is mounted inside camera housing 1. The photographer conventionally looks through ocular 5 and pentaprism 6 at the object image projected on focusing screen 4.

Film guide 7 with shutter curtains indicated as 8 is located at the camera back. A reflecting surface 9 is mounted in front of the shutter curtains and reflects the light from the objective and the reflex mirror.

A light sensitive diode 10 is mounted in the lower part of the camera body. First and second optical systems are mounted on a common support 11 and are located between diode 10 and reflecting surface 9.

Figure 6A:
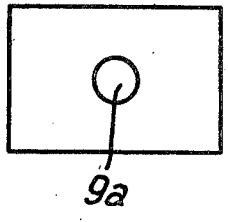
FIGS. 6a, 6b show the exposure measuring fields for selective and integrated measurements.

In the embodiment shown, the first optical system comprises a condenser 12. It focuses the light reflected from a central spot 9a of reflecting surface 9 onto diode 10. Spot 9a is relatively small, and therefore this measuring system is the selective mode (see also FIG. 6a).

Figure 6B:
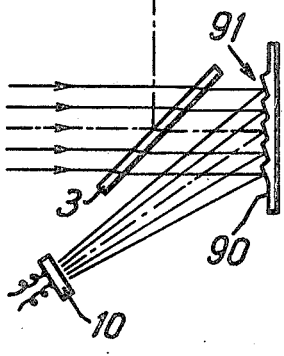
Figure 6B:
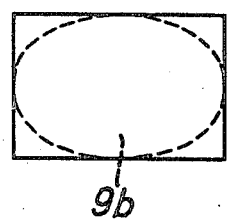

The second optical system is represented in this embodiment in schematic form as a condensing lens 13 preceded by a neutral density wedge 13a. In order that this system detect the light from nearly the entire reflecting surface 9, approximately from a region 9b (also see FIG. 6b), the condenser 13 is a lens with one cylindrical surface $b_1$ and one spherical surface $b_2$. However, the cylindrical surface may also be replaced by an aspherical one with different radii of curvatures in the x and y axes. This is the integrating measuring system.

Neutral density wedge 13a provides attenuation of the light intensity incident on diode 10 so that the same intensity is obtained for the integrating as for the selective measurement. The density of the wedge is selected accordingly. The wedge furthermore achieves bending of the light beam passing through it. This effect is desired to eliminate the skylight influence, which occurs strongly for instance when shooting landscapes. If this effect can be dispensed with, a plane parallel plate mounted in front of surface $b_2$ of condenser 13 may be provided as the attenuator instead of wedge 13a.

Figure 1A:
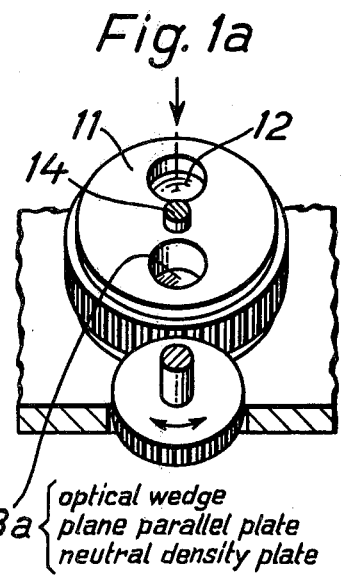
FIG. 1a is a detailed showing of the two optical measurement systems showing the common support and the changing apparatus.

In order to select between the integrating and the selective measurement, the common support 11 is rotatable about axis 14 by means as shown in FIG. 1a.

As shown, the common support is activated from outside the camera so that either the first optical system or the second is brought into position in front of diode 10. In this manner it is possible to pass between integrating and selective exposure measurements without requiring electrical switching. Obviously the arrangement of the common support also may be displaceable in lieu of being rotatable.

The reflecting surface 9 may be diffusely reflecting in simple embodiments, as shown in FIG. 1-3. Together with reflex mirror 3, this reflecting surface must be swung out of the beam prior to picture taking as shown in FIG. 3. When in the picture taking position, this reflecting surface may cover the focusing screen 4 and reflex mirror 3 from below, in which case it prevents light from entering ocular 5 and pentaprism 6.

In the most elementary embodiment, a special reflecting surface may be eliminated altogether. Instead the curtains or laminations of the focal plane shutter are themselves used as the reflecting element. In such embodiments these components are appropriately silvered or dyed a bright color.

Figure 5C:
FIGS. 5c, 5d are side views of FIGS. 5a and 5b respectively.
Figure 5D:
Figure 5A:
FIG. 5a, 5b are two front views of a special design of the reflecting surfaces.
Figure 4:
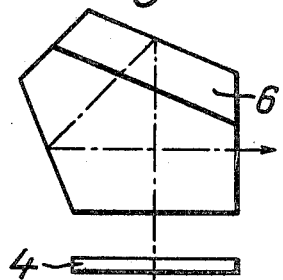
FIG. 4 is a schematic of the reflecting surface as a special embodiment.
Figure 5B:
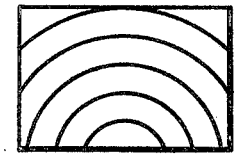

For highest efficiency in exposure metering, diode 10 receives collimated rather than diffuse light. As shown in FIG. 4, the reflecting surface 90 may be provided with steps 91 with slopes differing to such a degree that light incident on them is reflected toward small diode 10. Steps 91 may be stamped approximately as bosses so that the front side of the reflecting surface has the appearance approximately as shown in FIG. 5a. However, they also may be Fresnel rings, resulting in a surface as shown in FIG. 5b. Fresnel ring reflecting surfaces are disclosed in U.S. Pat. Nos. 3,837,738 and 3,982,822. Depending on the distance between reflecting surface and diode, the steps may be either plane or concave or convex, in any event they are such that the light is centrally condensed onto the diode.

Best Mode of Carrying out the Invention

The best mode of carrying out the invention known to the inventors is to provide an ordinary single lens reflex camera with a reflecting surface having a shape as shown in the FIGS. 4 and 5b. Such reflecting surface is hinged coaxially with the reflex mirror on an solid axis that is located inside a hollow axis. To the hollow axis there is fixed the reflex mirror and both, the hollow axis and the solid axis carry at one end gear wheels by means of which the reflecting surface and the reflex mirror are pivoted independently from one another to the picture taking position.

Further, a silicon diode of the type VTB 9416 B of Messrs. VACTEC, Inc., 2423 Northline Ind. Blvd., Maryland Heights, Mo. 63043, is to be positioned in the lower part of the camera housing. A rotatable support member in the form of a gear wheel is positioned in front of the diode, such member carrying the two optical systems for integrating and selective measurements. A further gear wheel is in mesh with the support member. This further gear wheel is supported in the bottom wall of the camera housing so that part of it is accessible for the photographer from the outside of the camera. By rotating the said further gear wheel either one of the two optical systems may be positioned in the path of the light rays travelling from the reflecting surface towards the diode.

When shooting a picture the operator will first decide whether the light is to be measured integrally or selectively, i.e. at a certain spot of the object. He will set the optical system in front of the diode accordingly. The picture is then taken in conventional manner by pressing a button and thereby releasing the reflex mirror and also the reflex surface to swing upward. The camera shutter is also opened and is thereafter automatically closed according to the object brightness.

We claim:

1. In a photographic camera having a through the lens exposure metering system with an exposure meter comprising a silicon-, or gallium-arsenide-phosphorus-diode, light passing through an objective of said system, said diode mounted in a space behind said objective and receiving said light, and having means for switching said exposure metering system between an integrating measurement and a selective measurement, the improvement comprising:

said integrating measurement comprising a first optical system guiding said light from substantially the entire object space onto said diode, said selective measurement comprising a second optical system, guiding said light from a restricted sector of said object space onto said diode, means for alternatively bringing said first and second optical systems into said light and in front of said diode, and a light intensity attenuator operably connected with said first optical system, said attenuator movable into said light together with said first optical system, said attenuator serving to achieve equal illumination intensities on said diode for both said integrating and selective measurements.

2. The photographic camera of claim 1 wherein both optical systems are mounted on one common support.

3. The photographic camera of claim 1 wherein said second optical system has means for illuminating said diode with a circular measuring field whereas said first optical system has means for illuminating said diode with approximately a rectangular measuring field.

4. The photographic camera of claim 3 wherein said second optical system comprises at least one spherical lens element whereas said first optical system comprises the combination of at least one lens element with one spherical and one cylindrical surface and a light intensity attenuator.

5. The photographic camera of claim 3 wherein said light intensity attenuator is a plane parallel plate.

6. The photographic camera of claim 5 wherein said plate is a neutral density plate.

7. The photographic camera of claim 3 wherein said light intensity attenuator is an optical wedge.

8. The photographic camera of claim 7 wherein said wedge is a neutral density wedge.

9. The photographic camera of claim 1 wherein said light is reflected by a reflecting surface, mounted in the path of said light, toward said diode.

10. The photographic camera of claim 9 wherein said reflecting surface is provided with steps directing the main ray of each bundle of said light reflected from a particular step approximately through the center of said optical systems.

11. The photographic camera of claim 10, wherein said steps are bosslike.

12. The photographic camera of claim 11 wherein said bosslike surfaces are curved.

13. The photographic camera of claim 10 wherein said steps are rings.

* * * * *